(12) United States Patent
Meiller et al.

(10) Patent No.: US 8,007,045 B2
(45) Date of Patent: Aug. 30, 2011

(54) HEADREST FOR A VEHICLE SEAT

(75) Inventors: Hermann Meiller, Wernberg-Köblitz (DE); Raymond Carter, Marina del Rey, CA (US); Hubert Keller, Amberg (DE)

(73) Assignee: Grammer AG, Amberg (DE)

( * ) Notice: Subject to any disclaimer, the term of this patent is extended or adjusted under 35 U.S.C. 154(b) by 612 days.

(21) Appl. No.: 11/630,775

(22) PCT Filed: Jun. 24, 2005

(86) PCT No.: PCT/DE2005/001138
§ 371 (c)(1),
(2), (4) Date: Mar. 24, 2009

(87) PCT Pub. No.: WO2006/000203
PCT Pub. Date: Jan. 5, 2006

(65) Prior Publication Data
US 2009/0218874 A1    Sep. 3, 2009

(30) Foreign Application Priority Data
Jun. 25, 2004    (DE) .................... 10 2004 030 933

(51) Int. Cl.
*A47C 1/10*    (2006.01)

(52) U.S. Cl. ........................................ 297/408; 297/391

(58) Field of Classification Search ............. 297/216.12, 297/391, 408, 284.3
See application file for complete search history.

(56) References Cited

U.S. PATENT DOCUMENTS

| 5,934,749 A | 8/1999 | Pond ........................ 297/188.04 |
| 5,997,091 A | 12/1999 | Rech ............................. 297/391 |

FOREIGN PATENT DOCUMENTS

| DE | 3039934 | 11/1983 |
| DE | 19653516 | 6/1997 |
| DE | 10317036 | 6/2004 |
| EP | 1106427 | 12/1999 |
| EP | 1160124 | 12/2000 |

*Primary Examiner* — Laurie Cranmer
(74) *Attorney, Agent, or Firm* — Andrew Wilford (57) ABSTRACT

The invention relates to a headrest (10) for a vehicle seat, comprising a central part (11) containing a cushion support and a cushion that is held on top of a seat back by means of at least one support rod, the front region of said headrest having a head support region (17). The cushion support is optionally pivotally mounted about a horizontal pivoting axis (x). A respective lateral part (12) is pivotally mounted on each side of the head support region (17), about a displacement axis (y), which extends respectively in a lateral direction in relation to the central part (11) and which is located in the upper region of the central part (11). The displacement axis (y) extends obliquely at a first angle (a) to the pivoting axis (x) and to a horizontal projection plane that is common to the pivoting axis (x) and backwards (h) in relation to the head support region (17), the displacement axis (y) being situated on a horizontal plane that runs parallel to the pivoting axis (x).

16 Claims, 11 Drawing Sheets

HEADREST FOR A VEHICLE SEAT

CROSS REFERENCE TO RELATED APPLICATIONS

This application is the US national stage of PCT application PCT/DE2005/001138, filed 24 Jun. 2005, published 5 Jan. 2006 as WO2006/000203, and claiming the priority of German patent application 102004030933.7 itself filed 25 Jun. 2004, whose entire disclosures are herewith incorporated by reference.

BACKGROUND OF THE INVENTION

The invention relates to a headrest for a passenger seat with a central part containing a cushion support provided with a cushion supported by at least one mounting bar on top of a seat back and having a front part having a head support region, the cushion support being optionally pivotal about a horizontal pivot axis, each side of the head support region carrying a respective side part provided with a cushion and pivotal about an adjustment axis extending laterally from the central part at an upper region of the central part.

BACKGROUND OF THE INVENTION

Such a headrest, which is in particular used in relation with motor-vehicle seats, is described for example in DE 30 39 934 C2 (cf. DE 196 53 516 A1).

In the basic form of the known headrest (DE 30 39 93 C2) a side part is mounted on each side of the central part containing a cushion support such that they can pivot around respective adjustment axes oriented in the upper region of the central part and extending parallel to the horizontal pivot axis of the cushion support. The two side parts can be pivoted together or separately such that the passenger's head is supported laterally as well as in the back, as is the case for a wing headrest (cf. e.g. DE 103 17 036 B3).

OBJECT OF THE INVENTION

Starting from the headrest according to DE 30 39 934 C2 the invention is based on the object of improving the known headrest such that additional advantageous applications are possible.

SUMMARY OF THE INVENTION

This object is solved by means of the corresponding features of the corresponding identical preamble and the features described below.

According to a first embodiment of the invention, the adjustment axis extends at a first angle relative to the pivot axis in a horizontal plane that includes the pivot axis and extends backward relative to the head support region so the adjustment axis is located in a horizontal plane parallel to the pivot axis.

In such a headrest, the two pivoted side parts together with the head support region form a space that opens outward away from the head support region or a cavity with an approximately trapezoidal horizontal cross section.

The advantage of such a first embodiment of the invention consists in that the passenger's head is not as closely surrounded as it is the case in the generic known headrest with side parts that can be pivoted toward each other. In fact, in the first embodiment of the invention, the passenger's head benefits from an additional side tolerance that is considered to be comfortable like in the above mentioned wing headrest.

Herein, it is substantial that the back of the passenger's head still can be supported on the head support region of the central part such that in case of acceleration due to a crash a sudden impact on the passenger's head can be avoided to a large extent. Moreover, the passenger's head is centered in the cavity that is formed between the side parts pivoted upward and the head support region that corresponds to the requirements of the passenger as far as comfort and safety are concerned.

According to a second embodiment of the invention, the adjustment axis extends at a second angle relative to the pivot axis in a vertical plane that includes the pivot axis and extends downward relative to the head support region, the adjustment axis being located in a vertical plane parallel to the pivot axis.

A headrest according to the invention with the above-described features provides a cavity when the side parts between the latter and the head support region are pivoted upward, which is designed as a downward trapezoidal convergent cavity in the vertical section. Such a cavity with its side inclined surfaces formed by the two side parts offers the advantage of a maximum supporting adjustment of the cavity to the individual body sizes of the passengers, independently of the possible height adjustability of a headrest.

The convergent design of the side head support surfaces formed by the two pivoted side parts is also advantageous since the passenger benefits from an exact side guiding when displacing his/her body slightly downward in order to achieve the non-operational position that, in fact, does not give to the passenger the feeling of being jammed in.

Finally, according to a third embodiment of the invention, the advantages associated to the features of first and second embodiments are combined with each other such that the adjustment axis extends with a first angle relative to a pivot axis in a horizontal plane that includes the pivot axis and backward relative to the head support region and that additionally the adjustment axis extends with a second angle relative to the pivot axis in a vertical plane that is in common with the pivot axis and downward relative the head support region.

BRIEF DESCRIPTION OF THE DRAWING

Further features of the invention are set out in the subclaims.

The drawings show preferred illustrated embodiments according to the invention. In the drawings

DETAILED DESCRIPTION

In the drawings, every headrest, regardless of its individual design, is always indicated at 10. Analogous components as far as their function is concerned are also identified with the same reference numbers in spite of different design.

Figure 1:
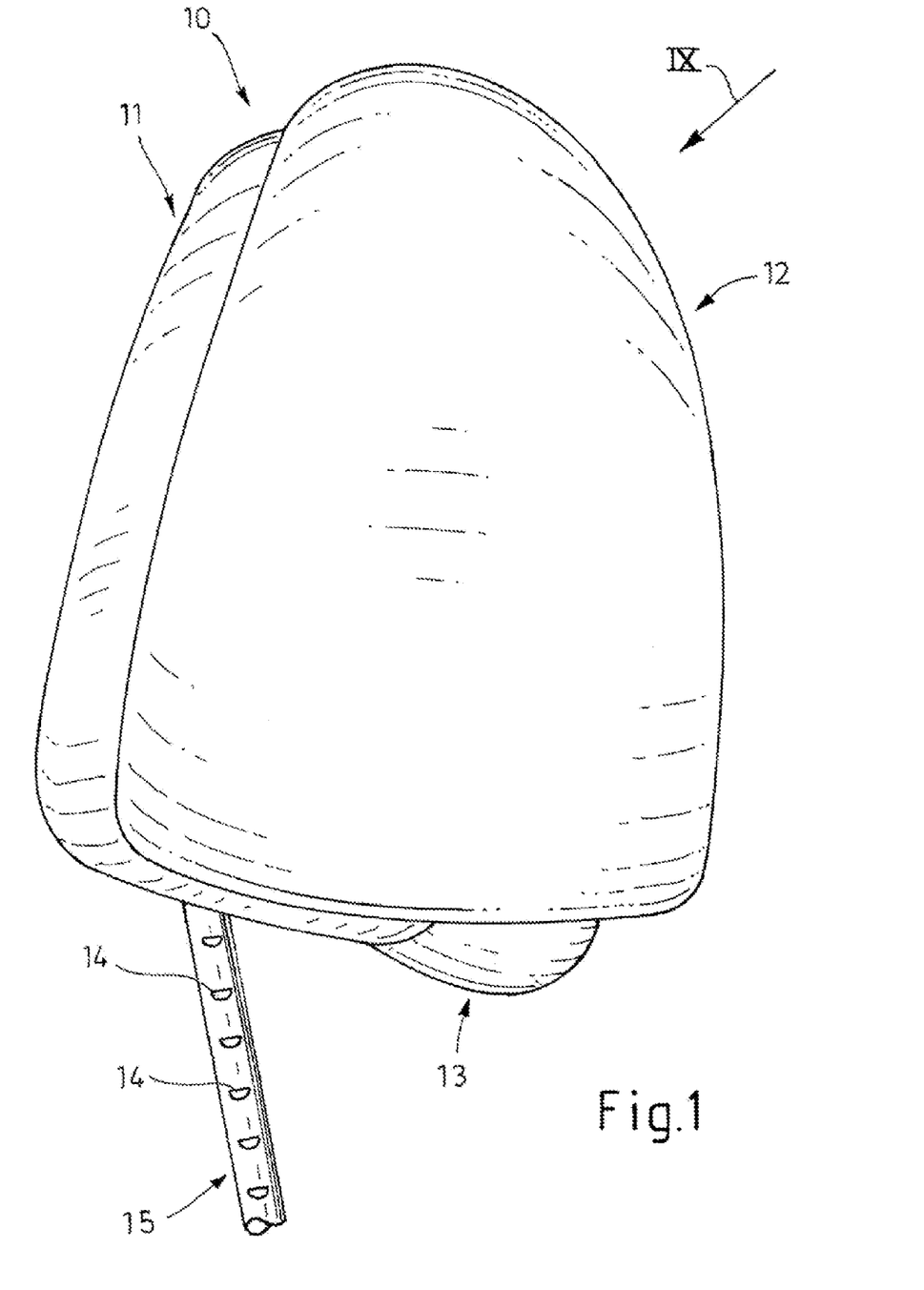
FIG. 1 is a schematic side view of a headrest with side parts pivoted back.
Figure 2:
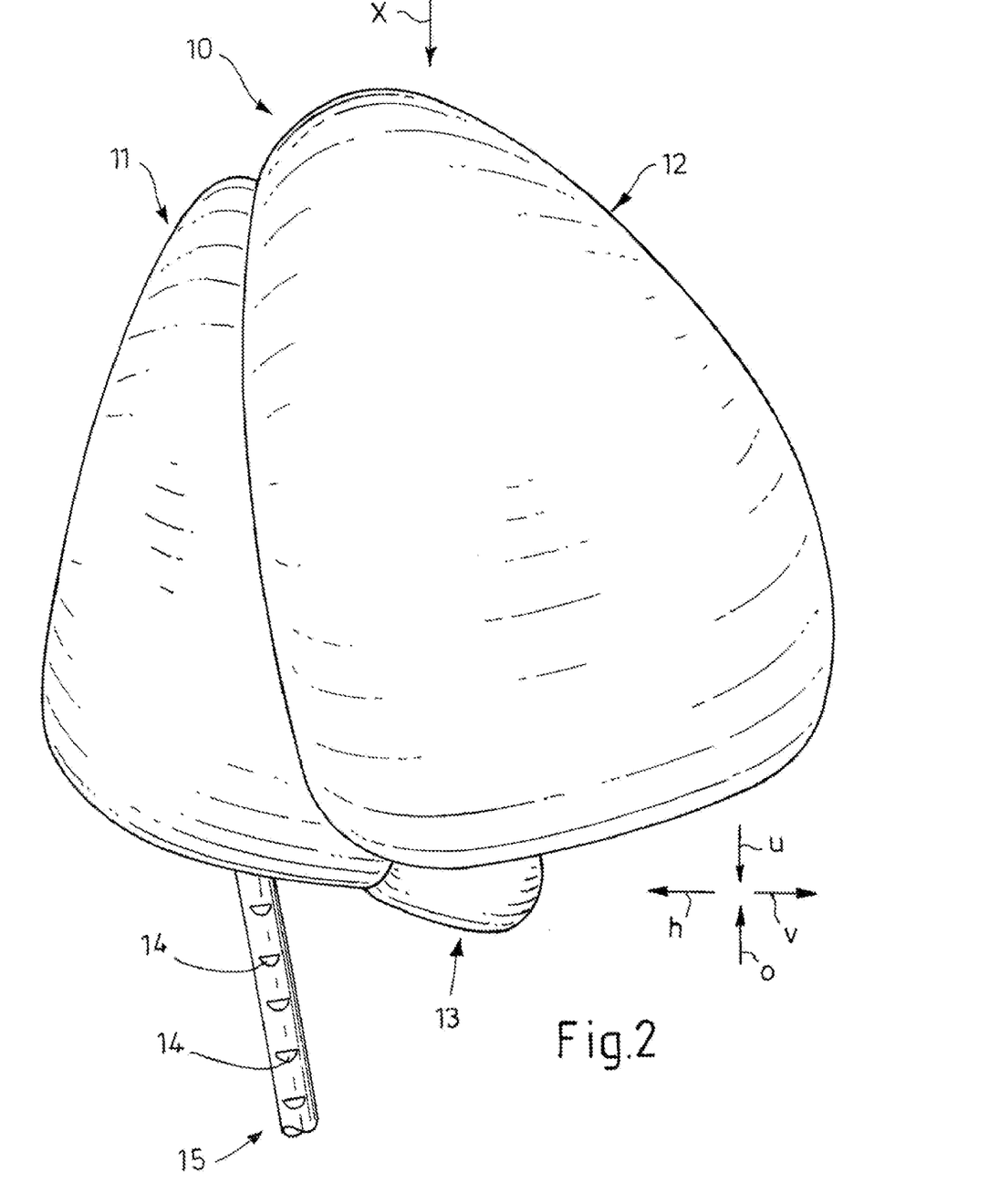
FIG. 2 is the headrest according to FIG. 1 with side parts pivoted forward and upward.

According to FIGS. 1 and 2, the headrest 10 is provided with a central part 11, two side parts 12 (in FIG. 1 and FIG. 2, only one side part 12 can be seen), a neck support 13, as well as with two mounting bars 15 having adjustment notches 14 (in FIG. 1 and FIG. 2 only one mounting bar 15 can be seen).

FIG. 1 shows the side part 12 in its rest position pivoted back and FIG. 2 shows the side part 12 in its use position pivoted forward.

Figure 3:
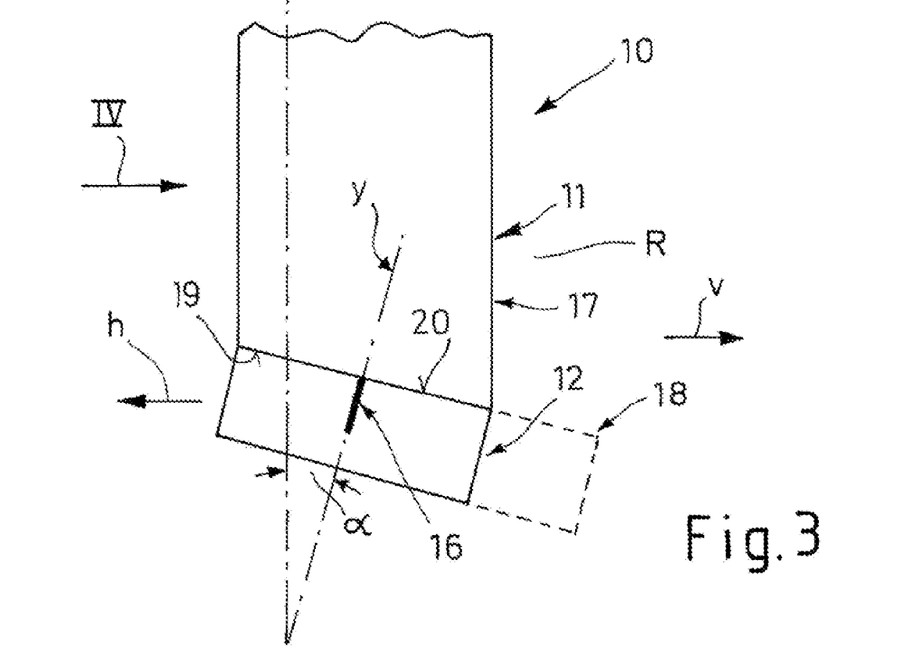
FIG. 3 is a schematically illustrated partial top view of a first embodiment of the headrest.
Figure 4:
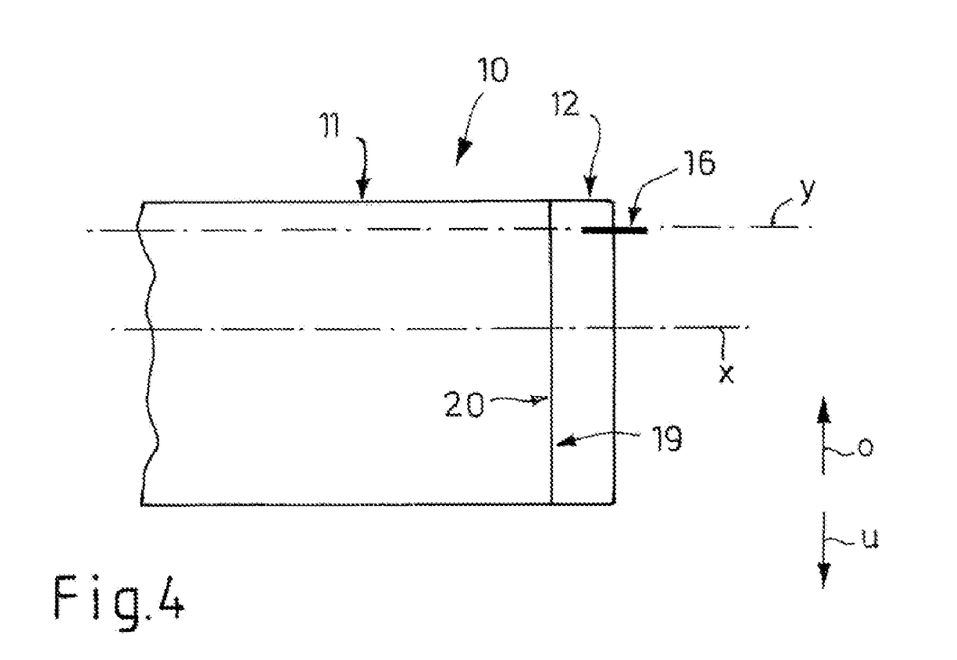
FIG. 4 is a back view of the headrest according to arrow IV of FIG. 3.
Figure 7:
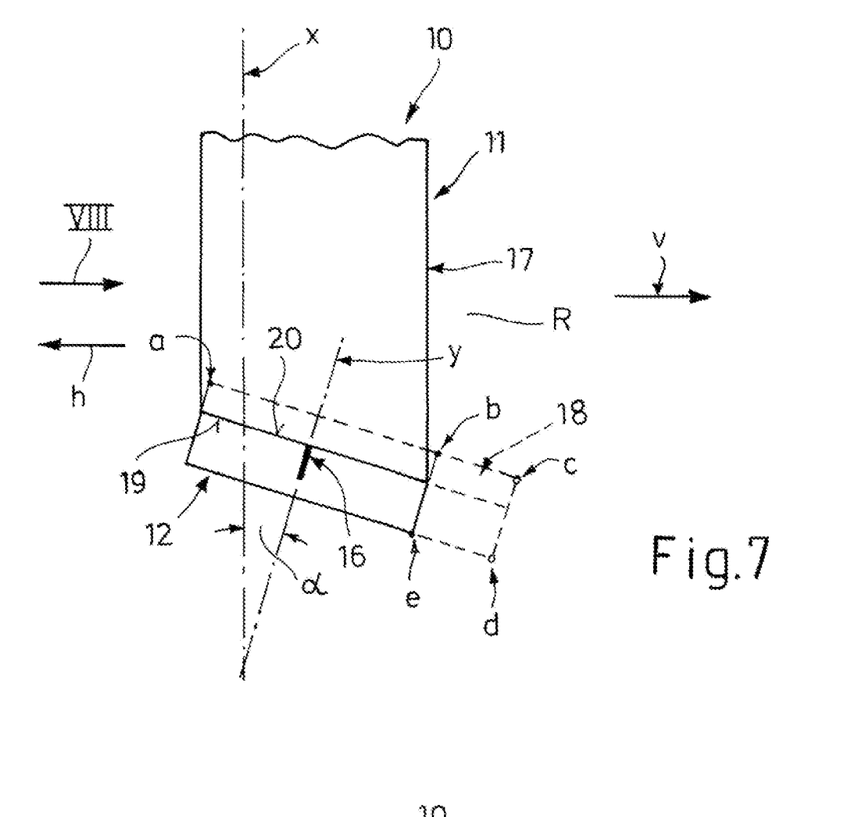
FIG. 7 is a schematically illustrated partial top view of a third embodiment of the headrest.
Figure 8:
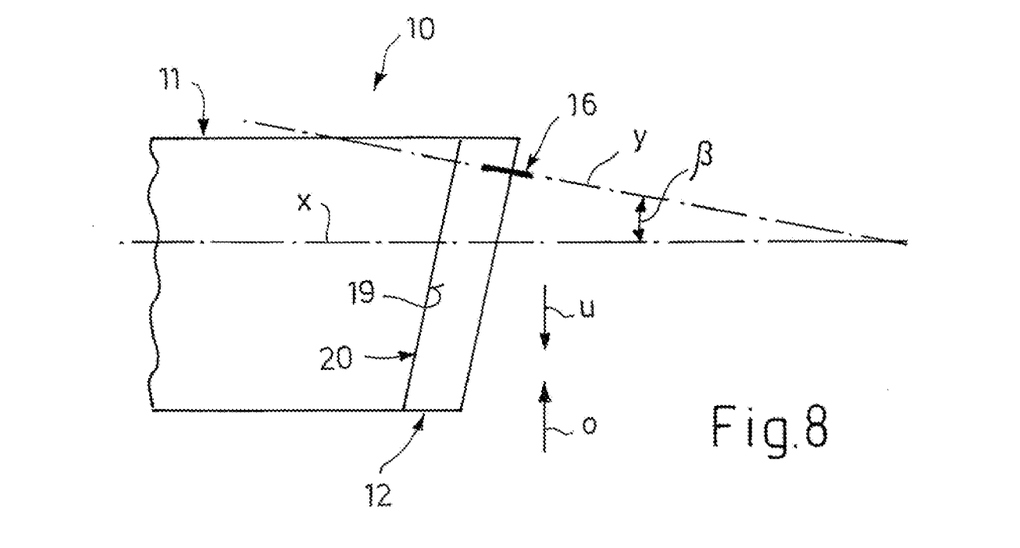
FIG. 8 is a back view of the headrest according to arrow VIII of FIG. 7.

In FIGS. 3 and 4 the substantial features of a first embodiment are shown. The central part 11 is shown only partially. Also in FIGS. 3 and 4 only one side part 12 can be seen (see also FIGS. 5, 6; FIGS. 7, 8). The horizontal pivot axis, shown by a dot-dash line, around which the central part 11 can be pivoted or inclined, is indicated at x, while the adjustment axis of adjustment shaft ends 16 (or one adjustment shaft end) is indicated at y. In FIGS. 3 and 4 also only one adjustment shaft end 16 can be seen (see also FIGS. 5, 6; FIGS. 7, 8).

FIGS. 3 and 4 show that the adjustment axis y extends at a first angle α relative to the pivot axis x in a horizontal plane (not shown) that includes the pivot axis x and backward in a direction h from the head support region 17. Simultaneously, the adjustment axis y is located in a horizontal plane (not shown) that is parallel to the pivot axis x.

Thus, when the side part 12 is pivoted forward in the direction v about the axis y and upward in the direction o, such that for example the position indicated by a dotted line in FIG. 3 is formed, the two pivoted side parts 12 with their side head support surfaces 18 together with their head support surfaces 18 form a space R that is opened away from the head support region 17 outward or forward in the direction v or a cavity with an approximately trapezoidal horizontal cross-section.

Figure 5:
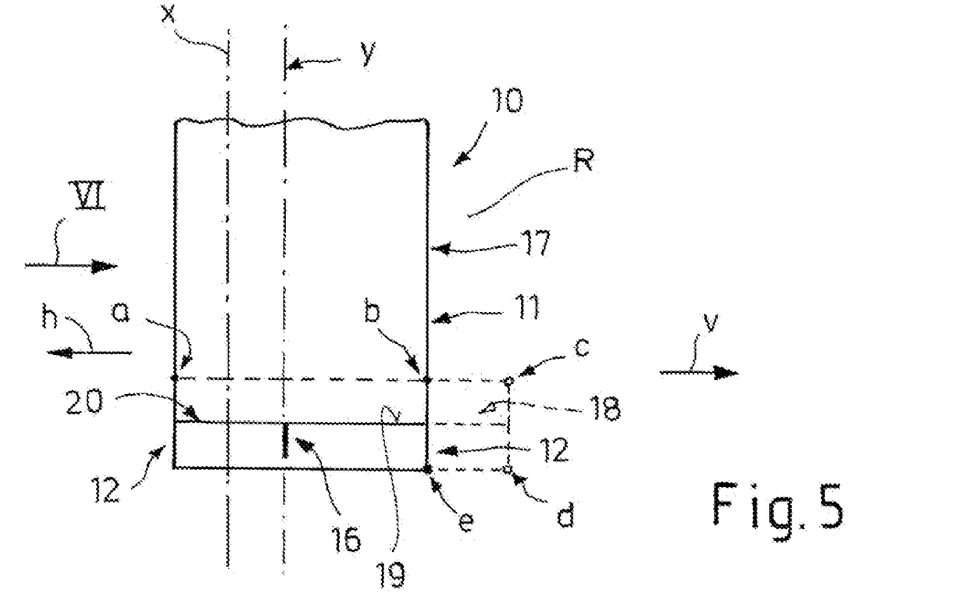
FIG. 5 is a schematically illustrated partial top view of a second embodiment of the headrest.
Figure 6:
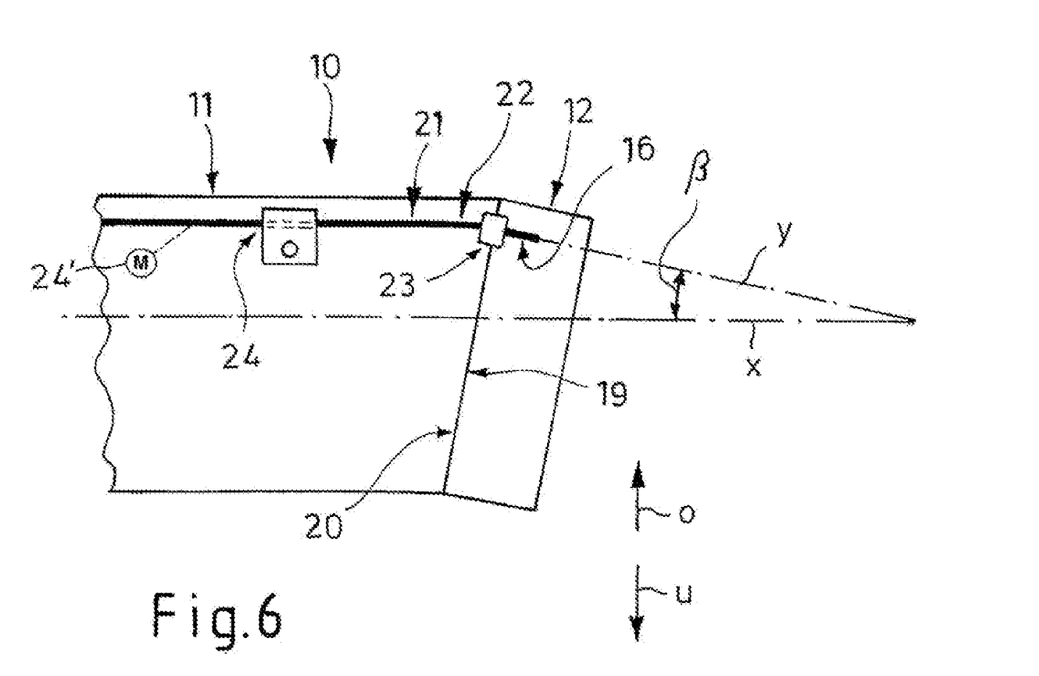
FIG. 6 is a back view of the headrest according to arrow VI of FIG. 5.

In the embodiment shown in FIGS. 5 and 6 according to FIGS. 3 and 4, the adjustment axis y extends parallel to the pivot axis x (FIG. 5) and extends with a second angle β relative to the pivot axis in a vertical plane (not shown) that includes the pivot axis x and downward relative to the head support region 17 (FIG. 6). Simultaneously, the adjustment axis y is located in a vertical plane (not shown) that is parallel to the pivot axis x.

The central part 11 forms a guide surface 19, and the side part 12 forms a complementary guide surface 20. By means of the dotted line shown in FIG. 5 between the points a and b, it can be seen to what extent the side part 12 supports the central part 11. The position indicated by dotted lines between the points b, c, d and e is intended to show how the side part 12 is pivoted upward in the direction o and forward in the direction v such that between the head support surfaces 18 of the side parts 12 and the head support region 17 a cavity or space R that is designed downwardly trapezoidal and tapered vertically, is formed.

Such a space R provides, due to its side head support surfaces 18 formed by the two side parts 12, the advantage of a supporting adaptation of the space R to different individual body sizes of passengers, independently of optional height adjustability of the headrest 10.

In FIG. 6 a particular embodiment is indicated according to which a connecting shaft 21 is located in the central part 11 or in the cushion support 26 that is not further defined in FIG. 6, the two ends of the connecting shaft 22 being coupled with respective adjustment shaft ends 16 by means of universal joints 23.

Moreover, the connecting shaft 21 is surrounded by a clamp-like brake element 24 and connected to a schematically illustrated drive motor 24'. Such a clamp-like brake element made of spring steel sheet is for example seen in EP 0764 557 B1.

In FIGS. 7 and 8 a third embodiment is schematically shown. The third embodiment is sort of a combination of the first embodiment (FIGS. 3 and 4) and the second embodiment (FIGS. 5 and 6). In fact, the adjustment axis y extends with a first angle α relative to the pivot axis x in the horizontal plane (not shown) that includes the pivot axis x and backward in the direction h relative to the head support region 17, the adjustment axis y also extending at a second angle β relative to the pivot axis x in a vertical plane (not shown) that includes the pivot axis x and downward (direction u) relative to the head support region 17.

By means of the dotted line between the points a and b that is shown in FIG. 7, it is understood to what extent the side part 12 extends under the central part 11. Simultaneously, by means of the dotted line between the points b, c, d and e it can be seen that a space R is formed between the head support region 17 and the head support surfaces 18, the horizontal cross section of which forms a trapezoid that widens outward or forward in the direction v.

Moreover, as seen in FIGS. 7 and 8 it is understood that in case of pivoted side parts 12 their head support regions 18 form together with the head support region 17 a space R, the vertical cross section of the space R forming a trapezoid that is downward convergent in the direction u.

Figure 9:
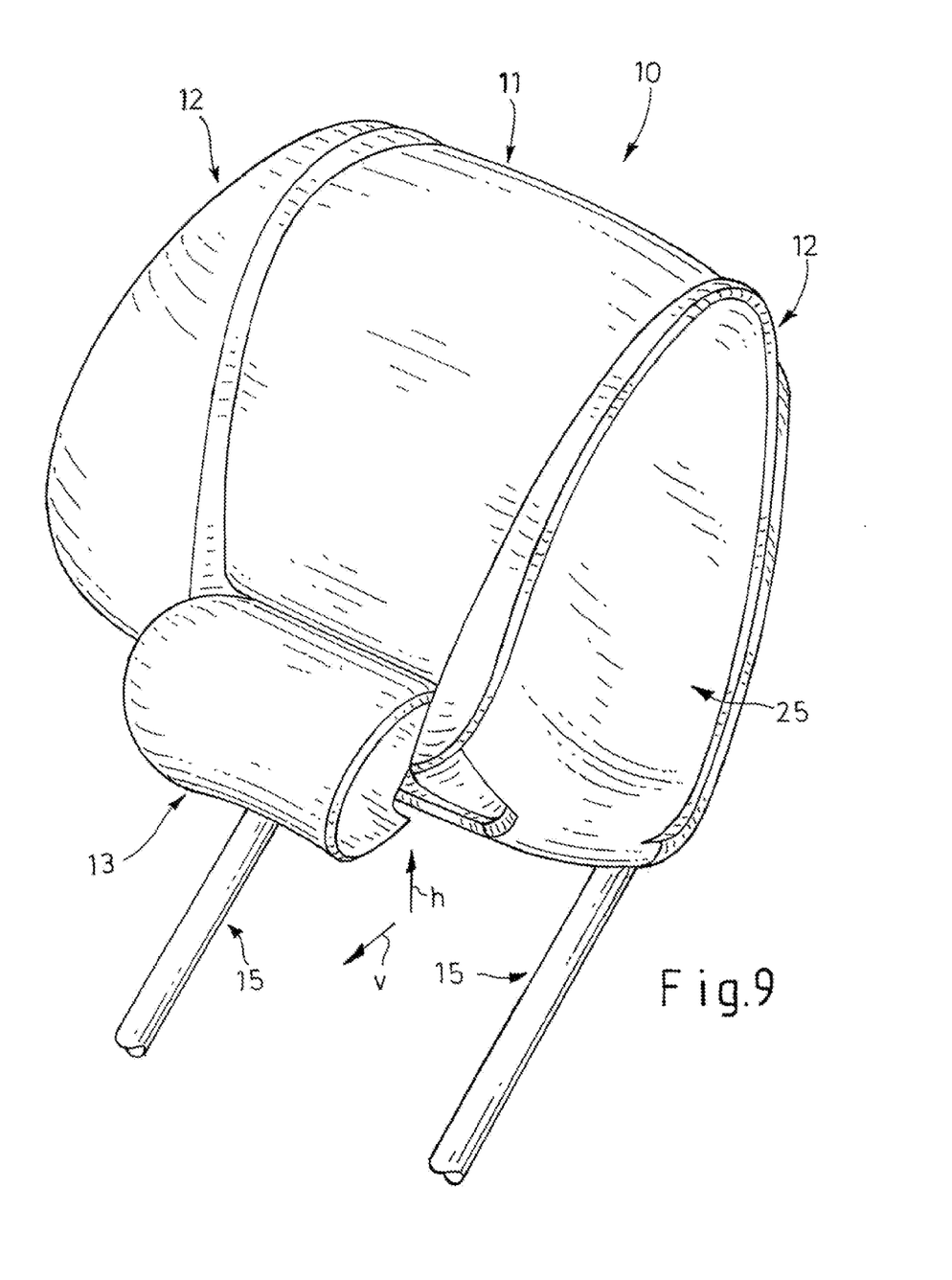
FIG. 9 is a perspective view of a headrest according to the illustrated embodiment and according to arrow IX of FIG. 1.
Figure 10:
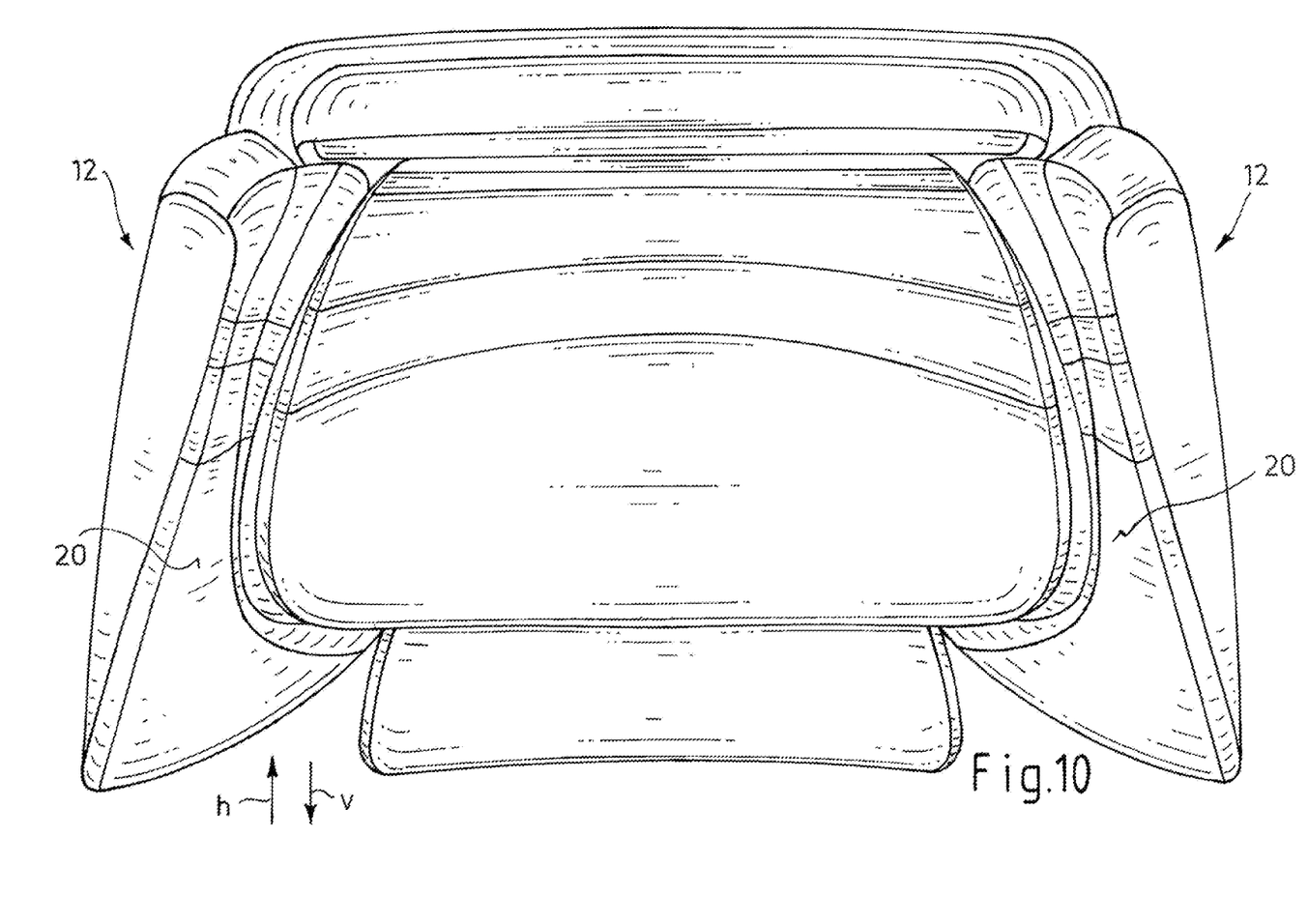
FIG. 10 is the headrest according to FIG. 9, with pivoted side parts, and according to arrow X of FIG. 2.

FIG. 9 shows in particular the central part 11, the two side parts 12 and the neck support 13 that is pivoted forward in the direction v and upward in the direction h. The components 11, 12, 12 as well as 13 are each designated by the reference number 25 (e.g. textile cloth or leather). Unlike FIG. 9, FIG. 10 shows the side parts 12 that are pivoted forward in the direction v as well as upward in the direction h by means of a combined pivoting movement. In FIG. 10 also the complementary guide surfaces 20 of the side parts 12 can be seen.

Figure 11:
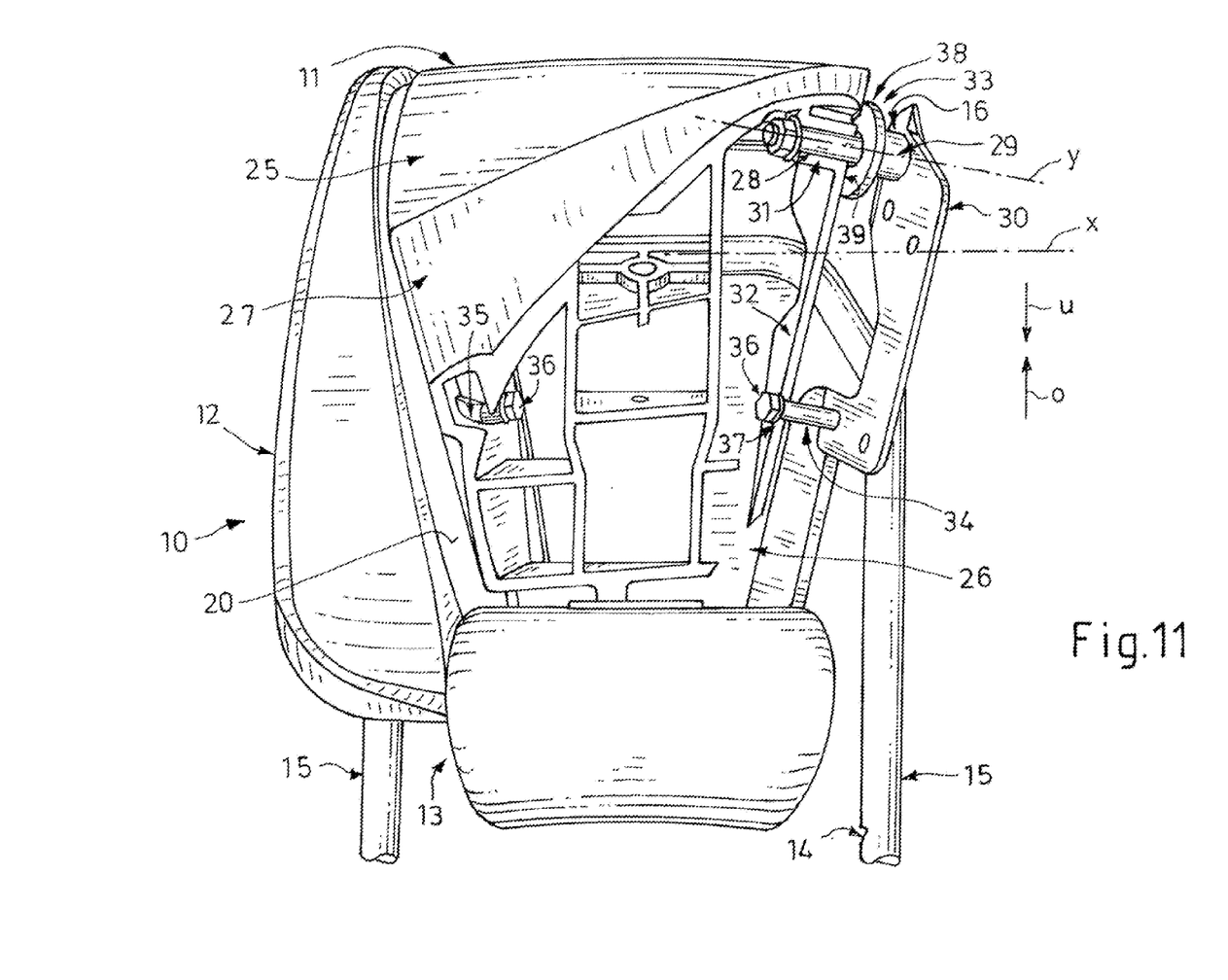
FIGS. 11 and 12 show elevational partly broken-away front views of the headrest as in FIG. 9 from two different angles.
Figure 12:
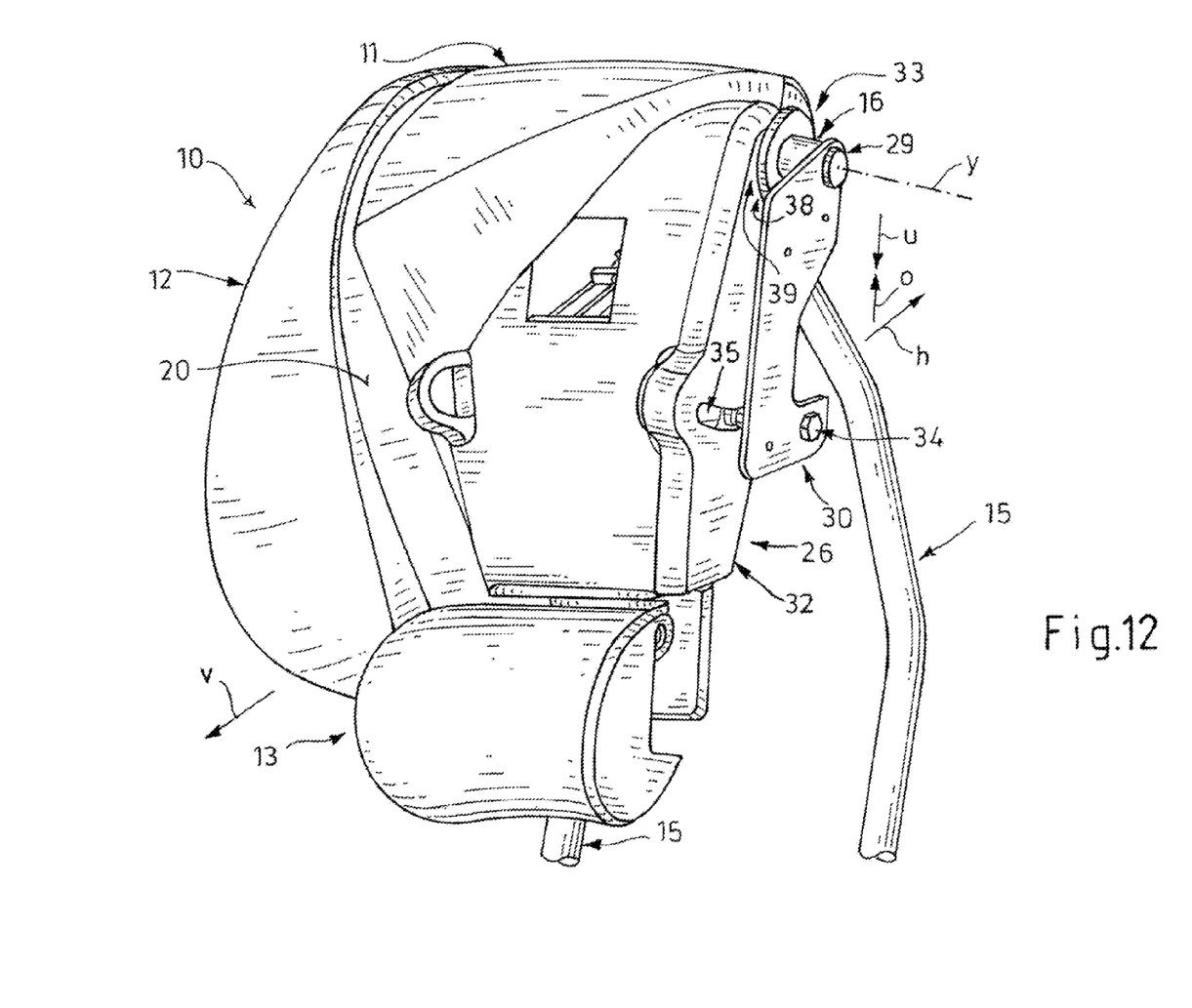

In FIGS. 11 and 12, a structure of the headrest can be seen that has a cushion support 26 as well as foam cushioning 27 enveloped by the cover 25. The adjustment shaft end 16 is coaxial with the adjustment axis x, the inner end 28 of the adjustment shaft end 16 is laterally secured inside the cushion support 26 and the outer end 29 in the side part 12, in fact on a base plate 30, against axial displacement. Here the outer end 29 is mounted on the base plate 30 so that it cannot pivot and the inner end 28 of the adjustment shaft end 16 is pivotally mounted in a bearing bush 31 in the cushion support 26, in fact in its end wall 32.

Between the inner end 28 and the outer end 29 of the adjustment shaft end 16 a brake element 33 is mounted, the primary part of which, a circular brake disk 38, is firmly connected with the adjustment shaft end 16 and the secondary part, namely a region 39 of the end wall 32 of the cushion support 26 that is turned outward, is firmly connected with the latter.

The base plate 30 of the side part 12 is provided with a guide bolt 34 that is guided in a slotted piece 35 formed by the end wall 32 of the cushion support 26. The guide bolt 34 is secured axially to the slotted piece 35 by means of its bolt head 36 and by means of a plain washer 37. By means of the arrangement of bolt and slotted piece 34, 35 the associated side part 12 can be pivoted relative to the central part 11 by means of the base plate 30 of the side part without the risk of getting jammed and in a safe manner. Simultaneously, a continuous pivotal locking is realized by means of the brake element 33.

FIG. 11 clearly shows that the adjustment axis y of the adjustment shaft end 16 can be inclined downward, i.e. in FIG. 11 in the view plane, as well as simultaneously downward in the direction u. The headrest 10 according to FIGS. 9-14 corresponds to the third embodiment that is schematically shown in FIGS. 7 and 8.

Whereas in particular according to the arrangement shown in FIG. 6 provided with a universal joint 23, the two side parts 12 are coupled to each other in a movable manner and can only be pivoted together, other embodiments such as also the embodiment according to FIGS. 9-14 adapted to the individually desired adjustment relations enable an independent pivoting movement of the two side parts 12.

Figure 13:
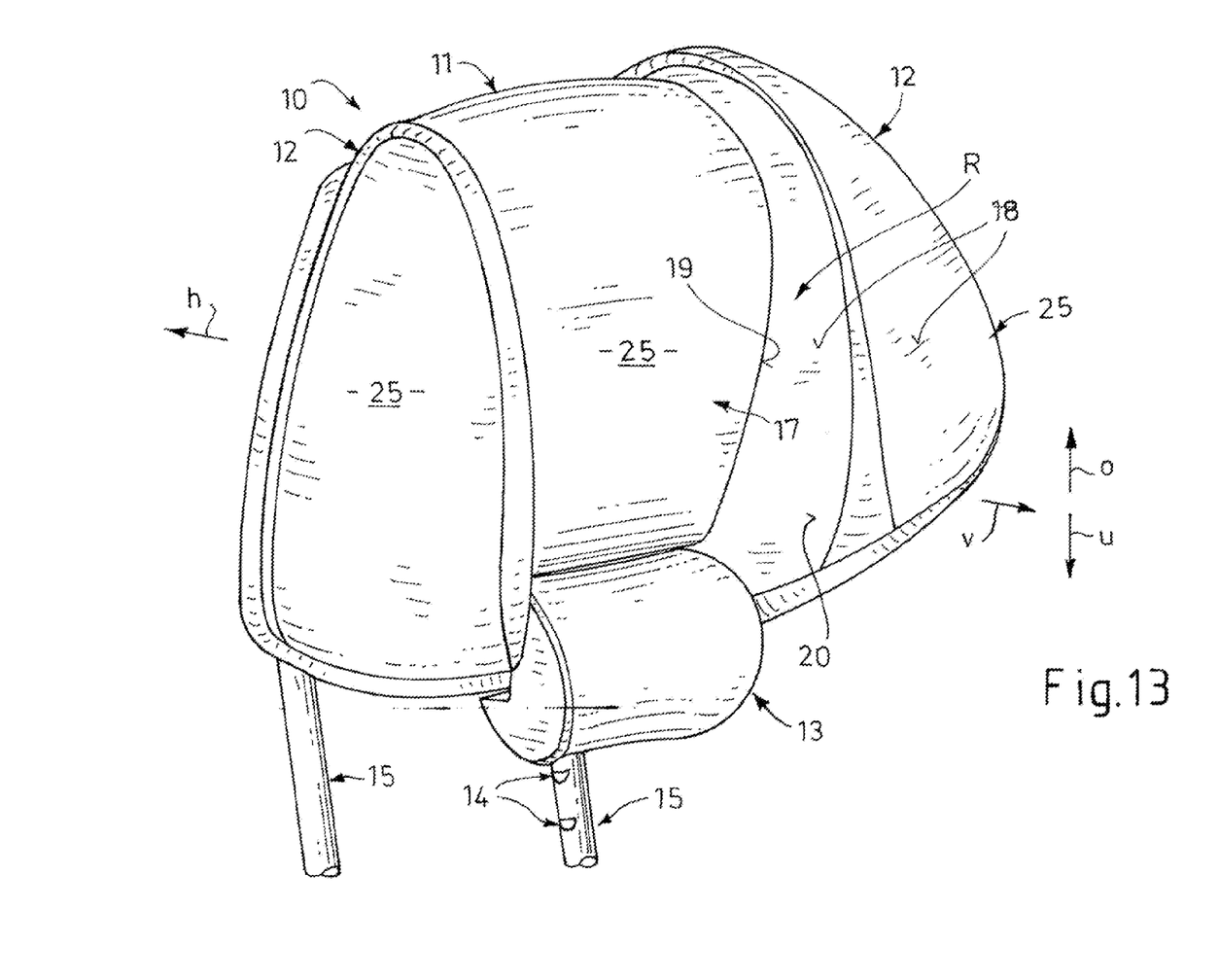
FIG. 13 is the headrest shown in FIG. 9 shown in perspective view with the left side part pivoted back and the right side part pivoted out.
Figure 14:
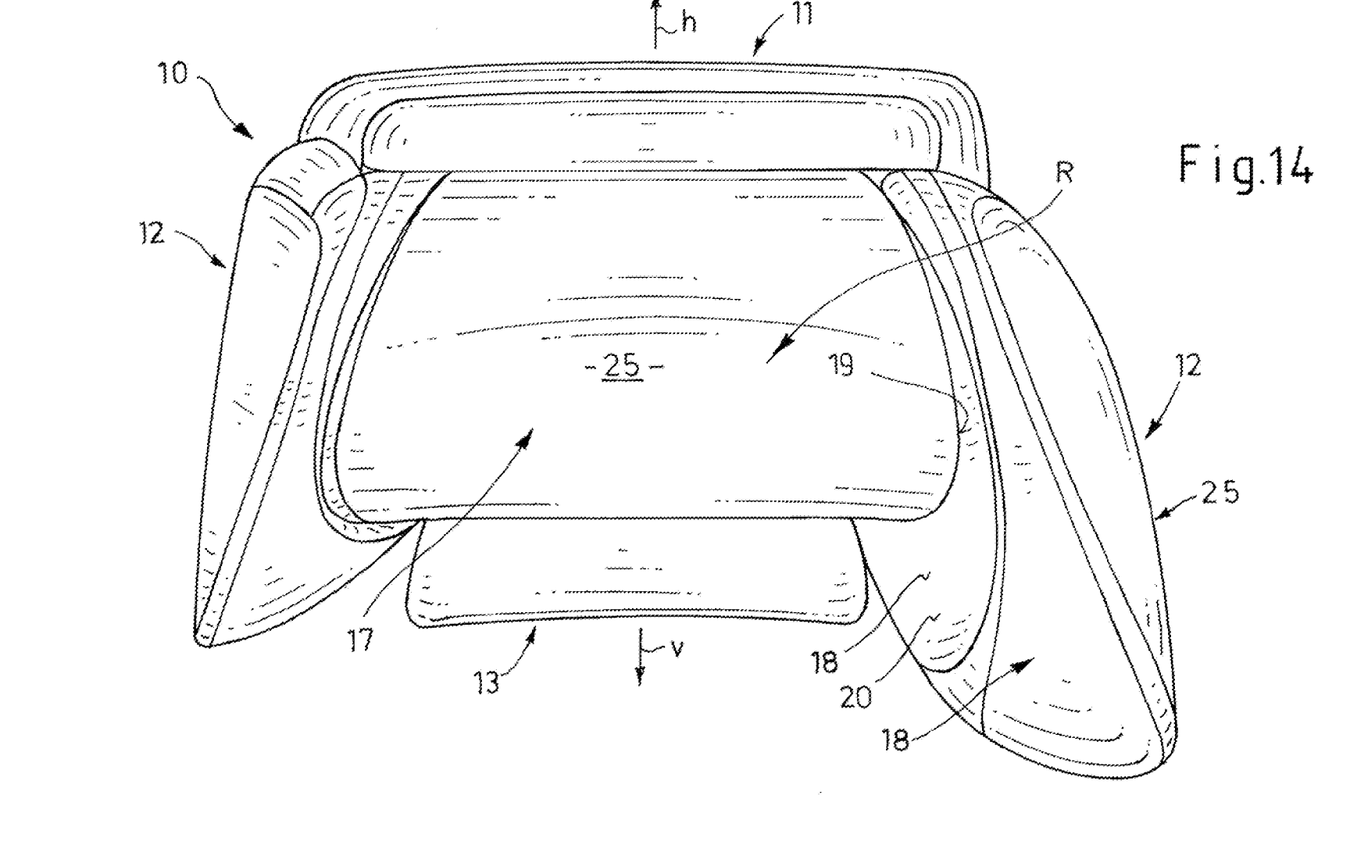
FIG. 14 is a top view of a headrest according to FIG. 13.

Thus, FIGS. 13 and 14 show that the left side part 12 has pivoted back into its rest position, whereas the right side part 12 is completely pivoted out. In FIGS. 13 and 14 also the guide surfaces 19 and the complementary guide surfaces 20 are shown.

The invention claimed is:

1. A headrest for a motor-vehicle seat, the headrest comprising:
    a central part;
    a mounting bar adapted for fixation in the seat and having an upper end carrying the central part;
    a cushion support;
    a pivot between the cushion support and the central part for pivoting of the cushion support on the central part about a pivot axis lying in a vertical plane and in a horizontal plane;
    a cushion on the cushion support having a horizontally forwardly directed front face and a pair of horizontally directed opposite ends flanking the front face;
    respective side parts at the ends of the cushion; and
    respective side pivots between the side parts and the cushion support for pivoting of the respective side parts about respective adjustment axes relative to the cushion support, each of the adjustment axes extending downward or rearward from the cushion and forming a small acute angle with at least one of the planes of the pivot axis.

2. The motor-vehicle headrest defined in claim 1 wherein each adjustment axis lies in a horizontal plane parallel to the horizontal plane of the pivot axis and extends back from the respective end toward the vertical plane of the pivot axis.

3. The motor-vehicle headrest defined in claim 1 wherein each adjustment axis lies in a vertical plane parallel to the vertical plane of the pivot axis and extends down from the respective end to the horizontal plane of the pivot axis.

4. The motor-vehicle headrest defined in claim 1 wherein each adjustment axis extends both down from the respective end to the horizontal plane of the pivot axis and back from the respective end to the vertical plane of the pivot axis.

5. The headrest according to claim 1, further comprising:
    a respective adjustment shaft end coaxial to each adjustment axis and has an inner end laterally mounted on the cushion support and an outer end secured against axial displacement in the respective side part.

6. The headrest according to claim 5, wherein the outer end of each adjustment shaft end is mounted so that cannot pivot relative to the respective side part and the inner end of each adjustment shaft end is mounted in the cushion support so that it can pivot about the respective adjustment axis.

7. The headrest according to claim 6, wherein the inner end of each adjustment shaft end is mounted pivotally in a respective end wall of the cushion support.

8. The headrest according to claim 6, wherein each side part is provided with a guide bolt that is fitted to a slotted piece of the cushion support.

9. The headrest according to claim 8, wherein the slotted piece is mounted in an end wall of the cushion support.

10. The headrest according to claim 8, wherein each guide bolt is secured axially on or in the respective slotted piece.

11. The headrest according to claim 5, further comprising:
    a respective brake element mounted between the inner end and the outer end of each adjustment shaft end and having a primary part firmly connected with the respective adjustment shaft end and a secondary part firmly connected with the cushion support.

12. The headrest according to claim 5, further comprising:
    a connecting shaft in the cushion support and having opposite ends coupled with a respective one of the adjustment shafts pivotally by a respective universal joint.

13. The headrest according to claim 12, wherein the connecting shaft is connected to a brake element or to a drive motor.

14. The headrest according to claim 1, wherein each adjustment axis extends through a guide surface of the central part as well as through a complementary guide surface of the respective side part.

15. The headrest according to claim 14, wherein each adjustment axis extends through both the guide surface that forms a plane, and the complementary guide surface that forms an orthogonal plane.

16. The headrest according to claim 1, further comprising:
    a neck support part mounted below the cushion support and between the two side parts and that can pivot toward the cushion support or away therefrom.

* * * * *